United States Patent
Huh et al.

(10) Patent No.: US 10,231,255 B2
(45) Date of Patent: Mar. 12, 2019

(54) APPARATUS AND METHOD FOR EFFECTIVE MULTI-CARRIER MULTI-CELL SCHEDULING IN MOBILE COMMUNICATION SYSTEM

(71) Applicant: Samsung Electronics Co., Ltd, Gyeonggi-do (KR)

(72) Inventors: Hoon Huh, Gyeonggi-do (KR); Jinwoo Lee, Gyeonggi-do (KR); Myoungseok Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 221 days.

(21) Appl. No.: 14/907,802

(22) PCT Filed: Jul. 24, 2014

(86) PCT No.: PCT/KR2014/006741
§ 371 (c)(1),
(2) Date: Jan. 26, 2016

(87) PCT Pub. No.: WO2015/012614
PCT Pub. Date: Jan. 29, 2015

(65) Prior Publication Data
US 2016/0165628 A1    Jun. 9, 2016

(30) Foreign Application Priority Data

Jul. 26, 2013  (KR) .................. 10-2013-0088438

(51) Int. Cl.
*H04W 72/12* (2009.01)
(52) U.S. Cl.
CPC .............. *H04W 72/1268* (2013.01)

(58) Field of Classification Search
None
See application file for complete search history.

(56) References Cited

U.S. PATENT DOCUMENTS

| 5,742,600 | A | * | 4/1998 | Nishihara | .......... | H04Q 11/0478 370/395.6 |
| 2010/0210276 | A1 | * | 8/2010 | Jang | .................. | H04W 72/0433 455/450 |

(Continued)

OTHER PUBLICATIONS

International Search Report dated Nov. 6, 2014 in connection with International Patent Application No. PCT/KR2014/006741, 6 pages.

(Continued)

*Primary Examiner* — George C Atkins

(57) ABSTRACT

Disclosed are an apparatus and a method for providing effective scheduling of resources of each cell and each carrier to a User Equipment (UE) when there are a plurality of cells and carriers in a carrier aggregation mobile communication system. A communication method of a Base Station (BS) includes: obtaining a mapping relation between a cell and a carrier for each UE; receiving scheduling information for each cell; distributing data of each UE to one of cells corresponding to UEs by using the mapping relation between the carrier and the cell and the scheduling information for each cell; and scheduling the distributed data. When a multi-carrier multi-cell scheduler to which a carrier aggregation technology is applied is implemented, the existing single carrier single cell scheduler can be re-used and the time required for the scheduling can be reduced by processing schedulers in parallel.

16 Claims, 8 Drawing Sheets

(56) References Cited

U.S. PATENT DOCUMENTS

| | | |
|---|---|---|
| 2011/0170510 A1* | 7/2011 | Ren ................ H04L 5/0032 370/329 |
| 2011/0237202 A1* | 9/2011 | Uemura ........... H04W 36/0088 455/67.14 |
| 2011/0317552 A1 | 12/2011 | Lee et al. |
| 2012/0039172 A1 | 2/2012 | Kim et al. |
| 2012/0127912 A1 | 5/2012 | Tian et al. |
| 2012/0155272 A1 | 6/2012 | Quan et al. |
| 2012/0263128 A1 | 10/2012 | Hu et al. |
| 2014/0106764 A1* | 4/2014 | Huang ............. H04W 72/1252 455/452.1 |
| 2014/0119287 A1* | 5/2014 | Ren ................ H04L 5/001 370/329 |
| 2015/0365910 A1* | 12/2015 | Takano ............. H04W 84/045 370/338 |

OTHER PUBLICATIONS

Written Opinion of the International Searching Authority dated Nov. 6, 2014 in connection with International Patent Application No. PCT/KR2014/006741, 4 pages.

* cited by examiner

[Fig. 1]
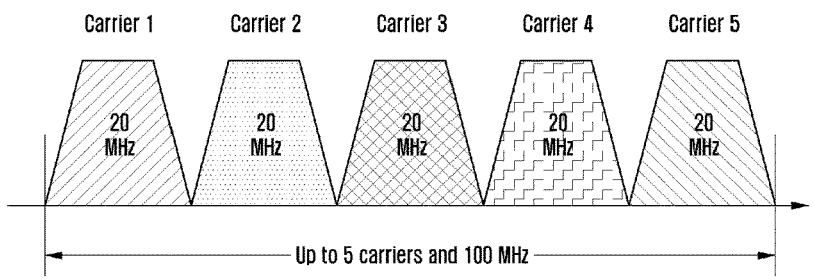
[Fig. 2]
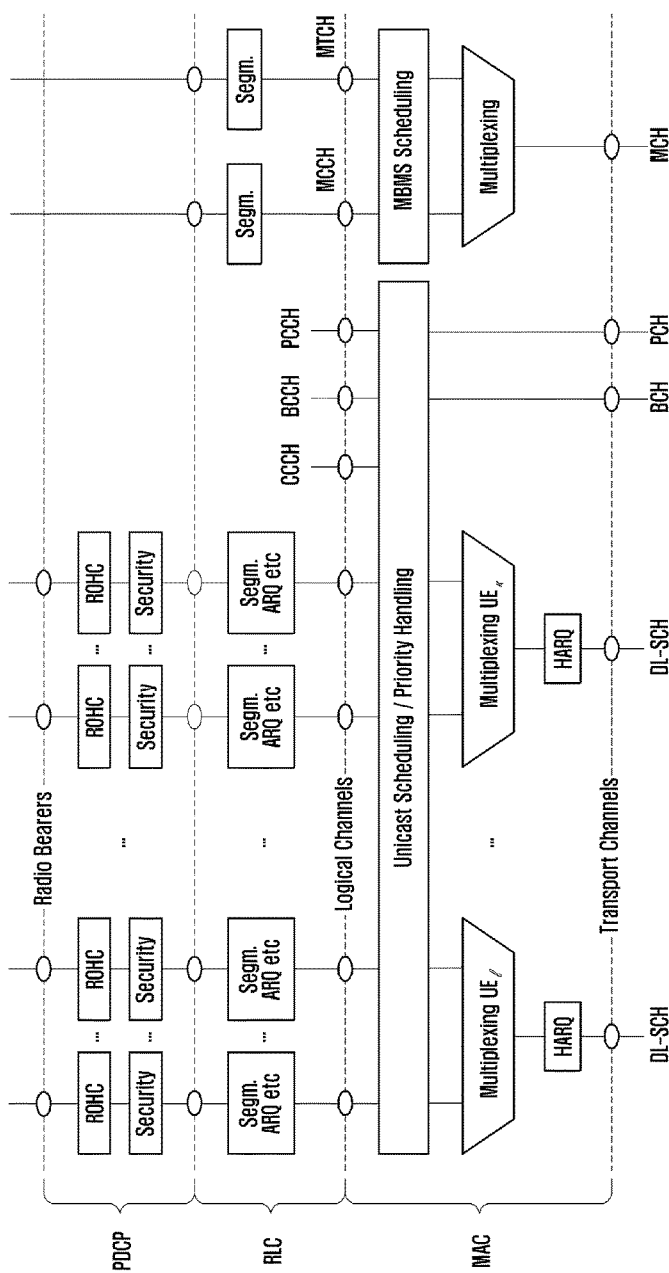

[Fig. 3]
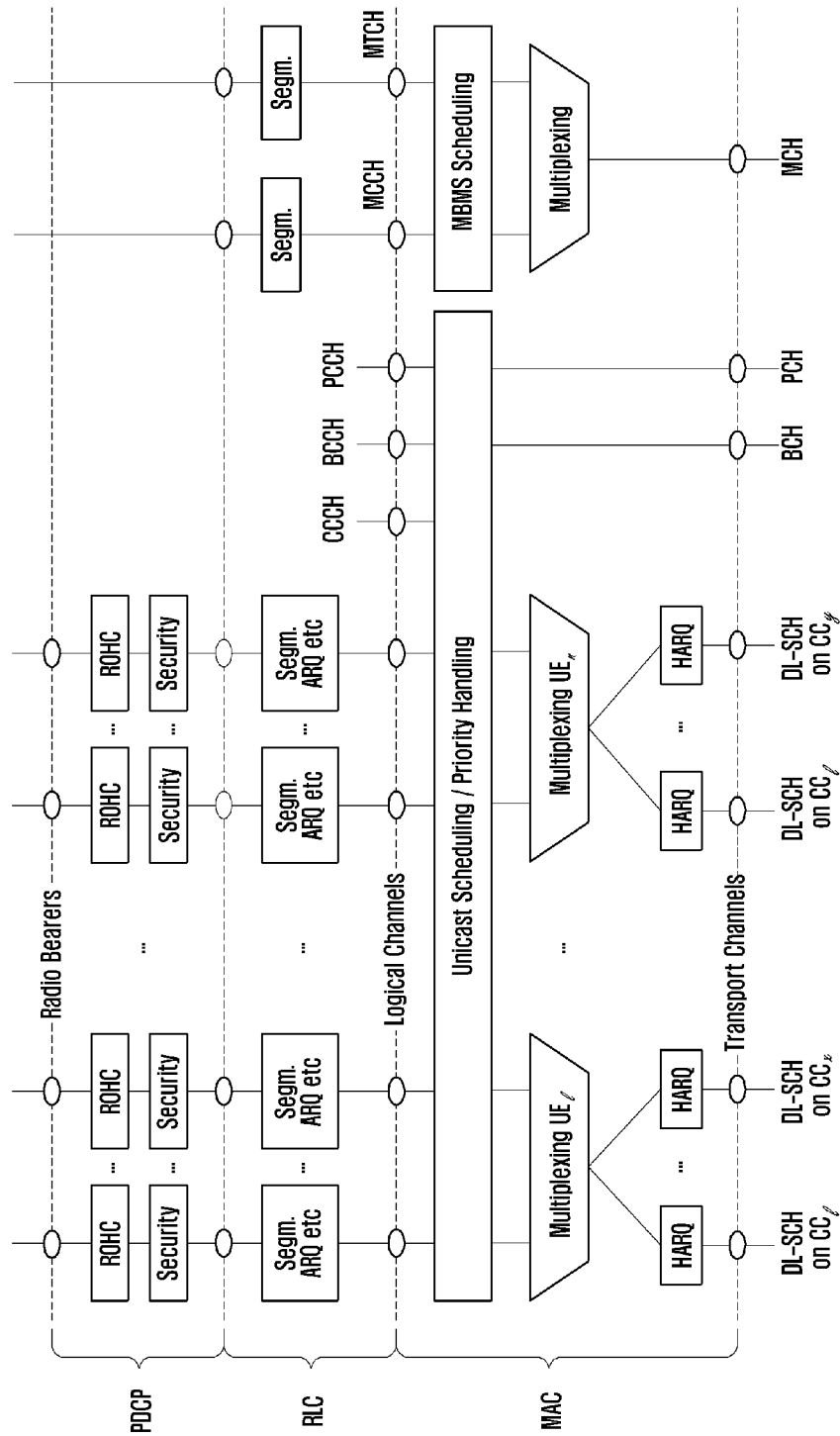

[Fig. 5]
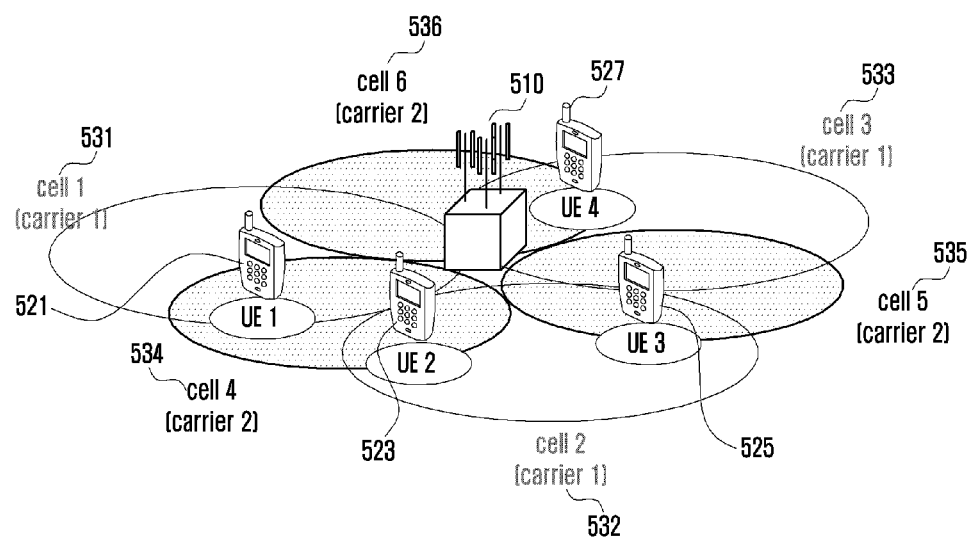

[Fig. 6]
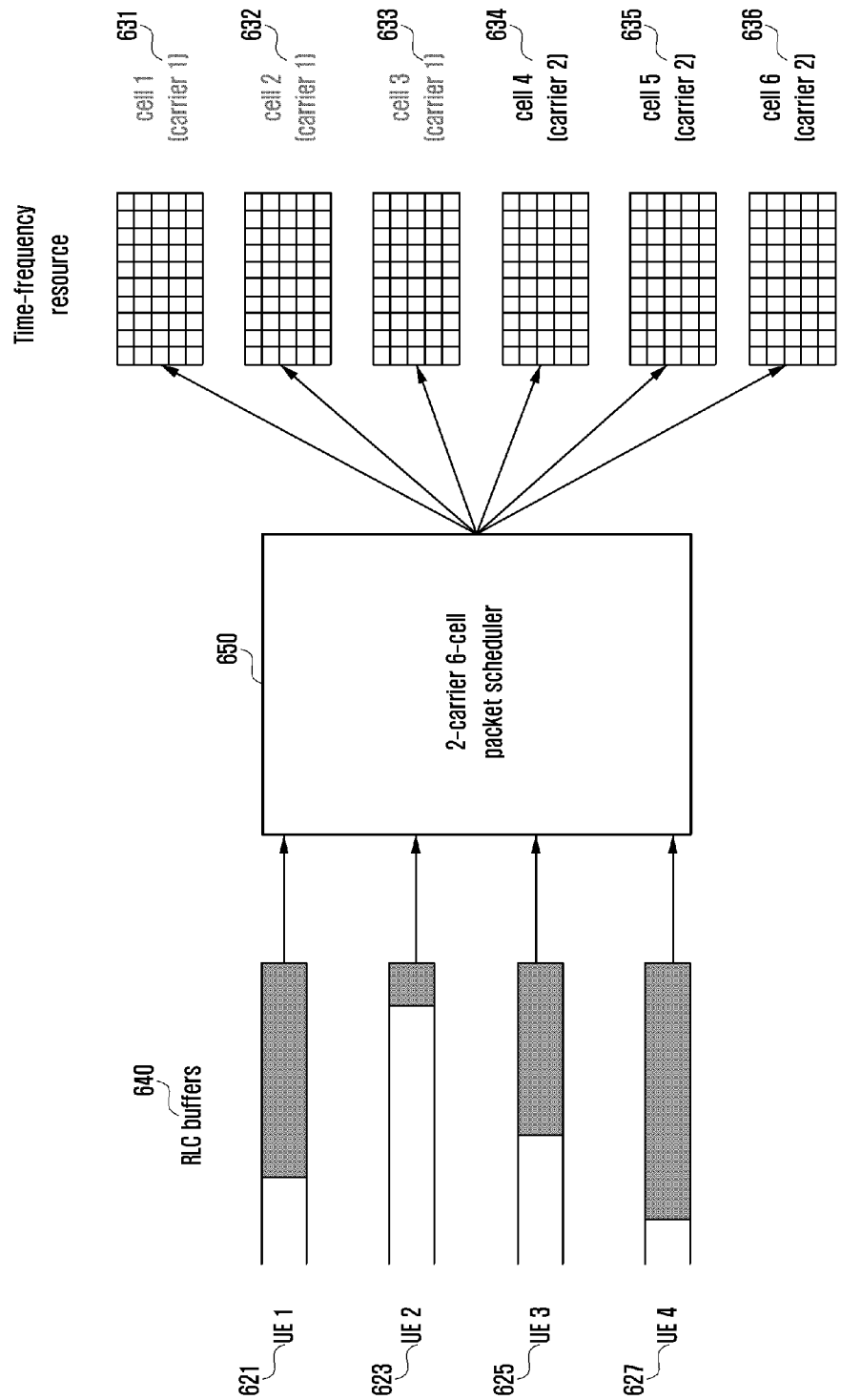

[Fig. 7]
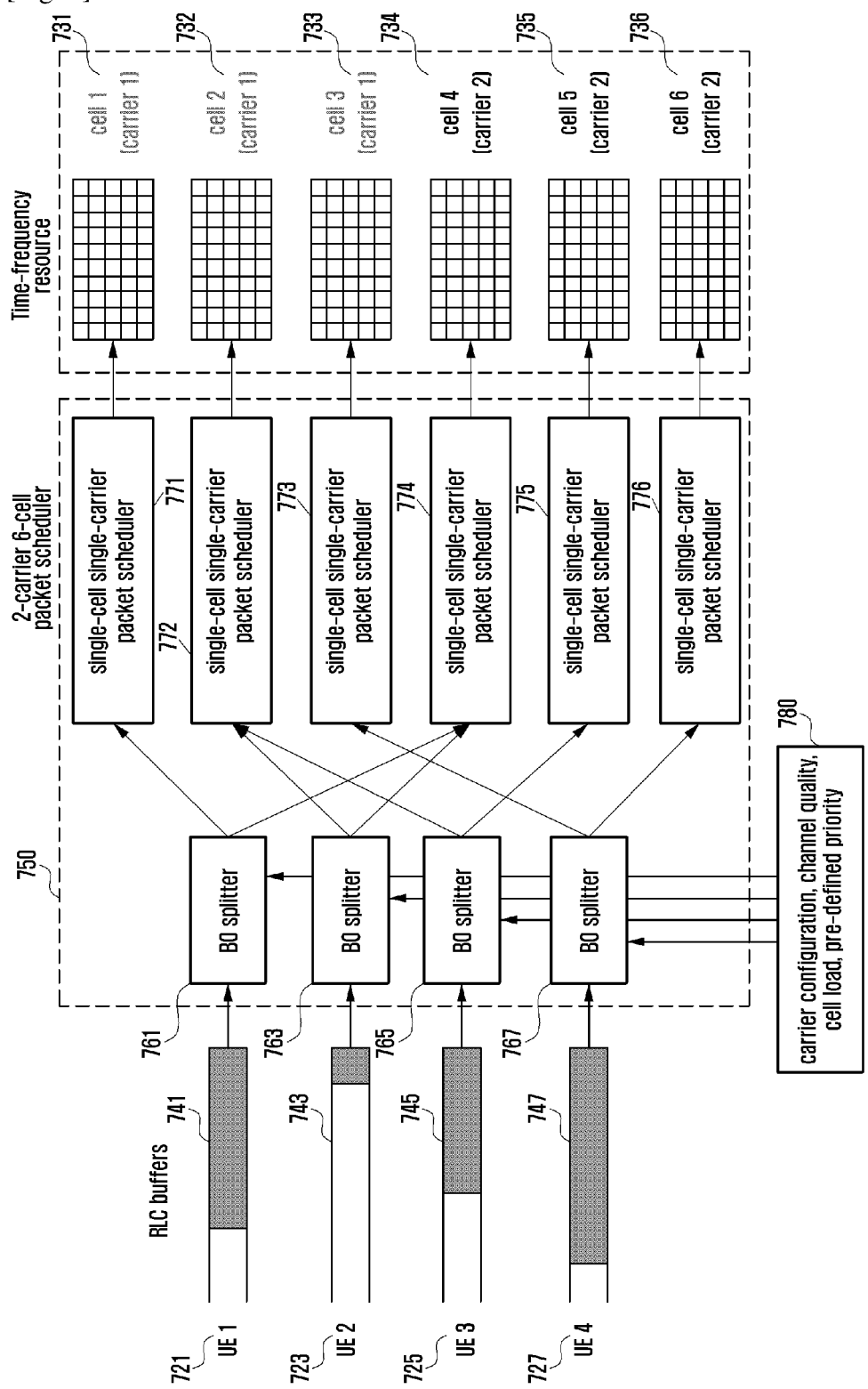

[Fig. 8]
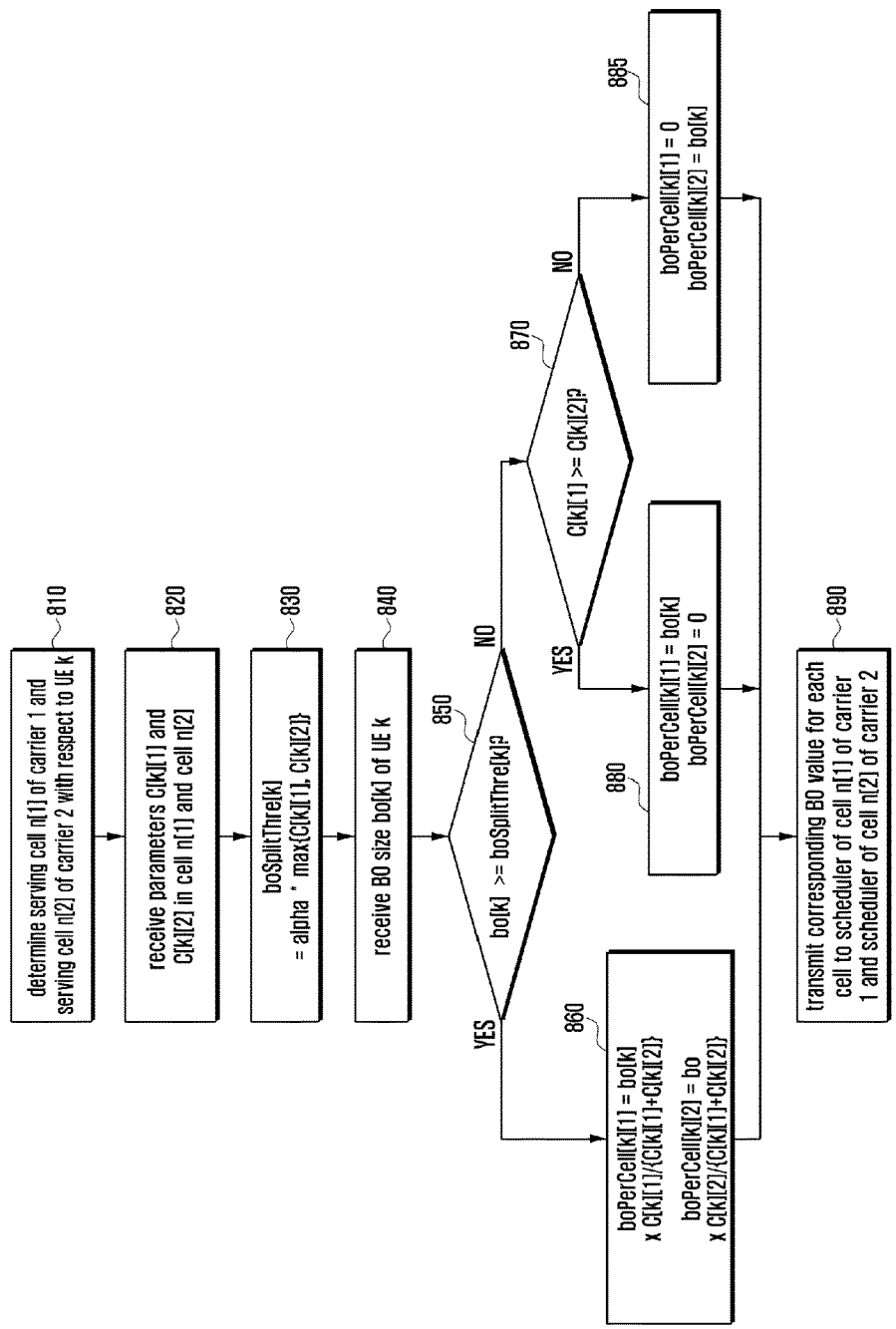
[Fig. 9]
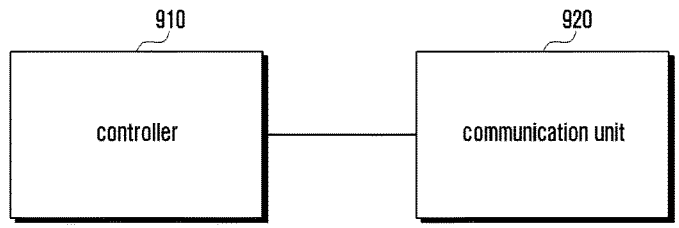

[Fig. 10]
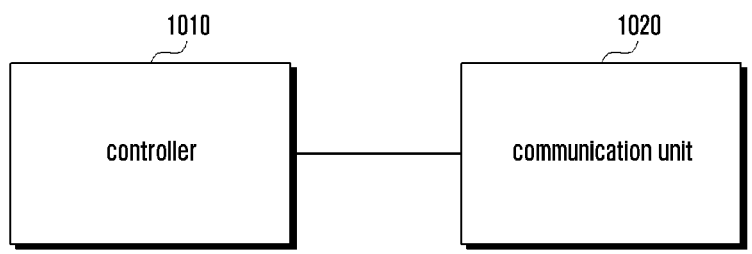

APPARATUS AND METHOD FOR EFFECTIVE MULTI-CARRIER MULTI-CELL SCHEDULING IN MOBILE COMMUNICATION SYSTEM

CROSS-REFERENCE TO RELATED APPLICATION(S)

The present application claims priority under 35 U.S.C. § 365 to International Patent Application No. PCT/KR2014/006741 filed Jul. 24, 2014, entitled "APPARATUS AND METHOD FOR EFFECTIVE MULTI-CARRIER MULTI-CELL SCHEDULING IN MOBLIE COMMUNICATION SYSTEM", and through International Patent Application No. PCT/KR2014/006741, to Korean Patent Application No. 10-2013-0088438 filed Jul. 26, 2013, each of which are incorporated herein by reference into the present disclosure as if fully set forth herein.

TECHNICAL FIELD

The present invention relates generally to an apparatus and a method for providing effective scheduling of resources of each cell and each carrier to a User Equipment (UE) when there are a plurality of cells and a plurality of carriers in a carrier aggregation mobile communication system. More particularly, the present invention relates to a method and an apparatus for effectively implementing a multi-cell and multi-carrier scheduler by using a conventional single carrier and single cell scheduler.

BACKGROUND ART

FIG. 1 illustrates an example of a configuration of a frequency band of a carrier aggregation technology.

The carrier aggregation technology increases a data transmission rate by combining two or more component carriers and transmitting the combined component carriers over the broadband. The carrier aggregation technology has been introduced to High Speed Packet Access (HSPS) and Long Term Evolution of 3rd Generation Partnership Project (3GPP) corresponding to a cellular mobile communication standard. Referring to FIG. 1, the carrier aggregation technology of LTE may combine a maximum of five carriers of 20 MHz and use a maximum bandwidth of 100 MHz. Further, each of the component carriers is compatible with an existing single carrier and thus supports a terminal which supports only the single carrier. The carrier aggregation technology has an advantage in that it effectively increases a data transmission rate since mobile communication service providing companies re-use the existing LTE systems in an environment where it is difficult to possess successive bands of 20 MHz or more. One carrier aggregation technology is flexibly installed and compatible with the existing technologies. Further, the carrier aggregation technology can operate different networks according to respective carriers and easily implement a heterogeneous network.

A Base Station (BS) of the carrier aggregation mobile communication system allocates frequency and time resources of multiple carriers to users, thereby increasing a data transmission rate of the user. However, since coverage of a cell may vary depending on each carrier, each user can select a predetermined cell based on each carrier according to a position of the user and a channel environment and the BS is required to support scheduling of a predetermined combination of carriers and cells based on each user.

DISCLOSURE OF INVENTION

Technical Problem

The present invention has been made to solve the above problems and an aspect of the present invention is to, when a multi-carrier multi-cell scheduler to which a carrier aggregation technology is applied is implemented, reduce the time required for scheduling and provide expandability for various environments by re-using the existing single carrier single cell scheduler and processing respective schedulers in parallel.

The technical subjects pursued in the present invention may not be limited to the above mentioned technical subjects, and other technical subjects which are not mentioned may be clearly understood, through the following descriptions, by those skilled in the art of the present invention.

Solution to Problem

In accordance with an aspect of the present invention, a communication method of a Base Station (BS) is provided. The communication method includes: obtaining a mapping relation between a cell and a carrier for each User Equipment (UE); receiving scheduling information for each cell; distributing data of each UE to one of cells corresponding to UEs by using the mapping relation between the carrier and the cell and the scheduling information for each cell; and scheduling the distributed data.

The distributing of the data may include allocating the data of each UE to a scheduler and the scheduling of the distributed data comprises scheduling the distributed data to a cell corresponding to the scheduler by the scheduler, and the scheduling information for each cell may include at least one of information on a size of the data for each UE, channel quality information, a load amount of each carrier, a load amount of each cell, a preset priority of each carrier, and a preset priority of each cell.

The distributing of the data may include: receiving a reference value for each cell with respect to cells corresponding to the UEs; configuring a data distribution threshold of each UE by using the reference value for each cell; comparing the data distribution threshold and a size of the data of each UE; and, when the size of the data of each UE is larger than or equal to the data distribution threshold, distributing the data of each UE to the cells corresponding to the UEs according to the reference value for each cell.

The communication method may further include, when the size of the data of each UE is smaller than the data distribution threshold, distributing the data of each UE to a cell having a large reference value for each cell.

The reference value for each cell may include at least one of a data transmission rate for each carrier according to a channel status of each UE, an available resource amount of a cell included in a carrier of each UE, and a preset constant for a cell included in a carrier of each UE.

The data distribution threshold may be a value generated by multiplying a largest value of the reference values for respective cells by a preset constant.

The distributing of the data may include distributing the data of each UE to the cells corresponding to the UEs according to a ratio of the reference values for respective cells.

In accordance with another aspect of the present invention, a Base Station (BS) includes: a communication unit for communication with a User Equipment (UE); and a controller for obtaining a mapping relation between a cell and a carrier for each UE, receiving scheduling information for each cell, distributing data of each UE to one of cells corresponding to UEs by using the mapping relation between the carrier and the cell and the scheduling information for each cell, and scheduling the distributed data.

Advantageous Effects of Invention

When a multi-carrier multi-cell scheduler to which a carrier aggregation technology is applied is implemented, communication methods of a BS and a UE according to an embodiment of the present invention can reduce the time required for scheduling by re-using the existing single carrier single cell scheduler and processing respective schedulers in parallel.

Further, when a carrier aggregation system scheduler is implemented, communication methods of a BS and a UE according to an embodiment of the present invention processes scheduling of respective carriers and cells in parallel, thereby efficiently supporting carrier aggregation between a plurality of carriers and a plurality of cells. In addition, the present invention can reduce scheduling time and complexity and provide expandability to easily increase the number of carriers or cells.

Effects obtainable from the present invention may not be limited to the above mentioned effects, and other effects which are not mentioned may be clearly understood, through the following descriptions, by those skilled in the art of the present invention.

BRIEF DESCRIPTION OF DRAWINGS

The above and other objects, features and advantages of the present invention will be more apparent from the following detailed description in conjunction with the accompanying drawings, in which:

FIG. 1 illustrates an example of a frequency band configuration of a carrier aggregation technology;

FIG. 2 schematically illustrates a single carrier downlink protocol structure;

FIG. 3 schematically illustrates a carrier aggregation downlink protocol structure;

FIG. 5 illustrates an example of distribution of UEs in the example of the wireless network scenario of the carrier aggregation technology;

FIG. 6 illustrates an example of a multi-cell carrier scheduler;

FIG. 7 illustrates an example of a multi-cell carrier scheduler according to an embodiment of the present invention;

FIG. 8 illustrates an example of a flowchart illustrating operations of a BO splitter according to an embodiment of the present invention;

FIG. 9 is a block diagram illustrating a BS according to an embodiment of the present invention; and FIG. 10 is a block diagram illustrating a UE according to an embodiment of the present invention.

MODE FOR THE INVENTION

Figure 4:
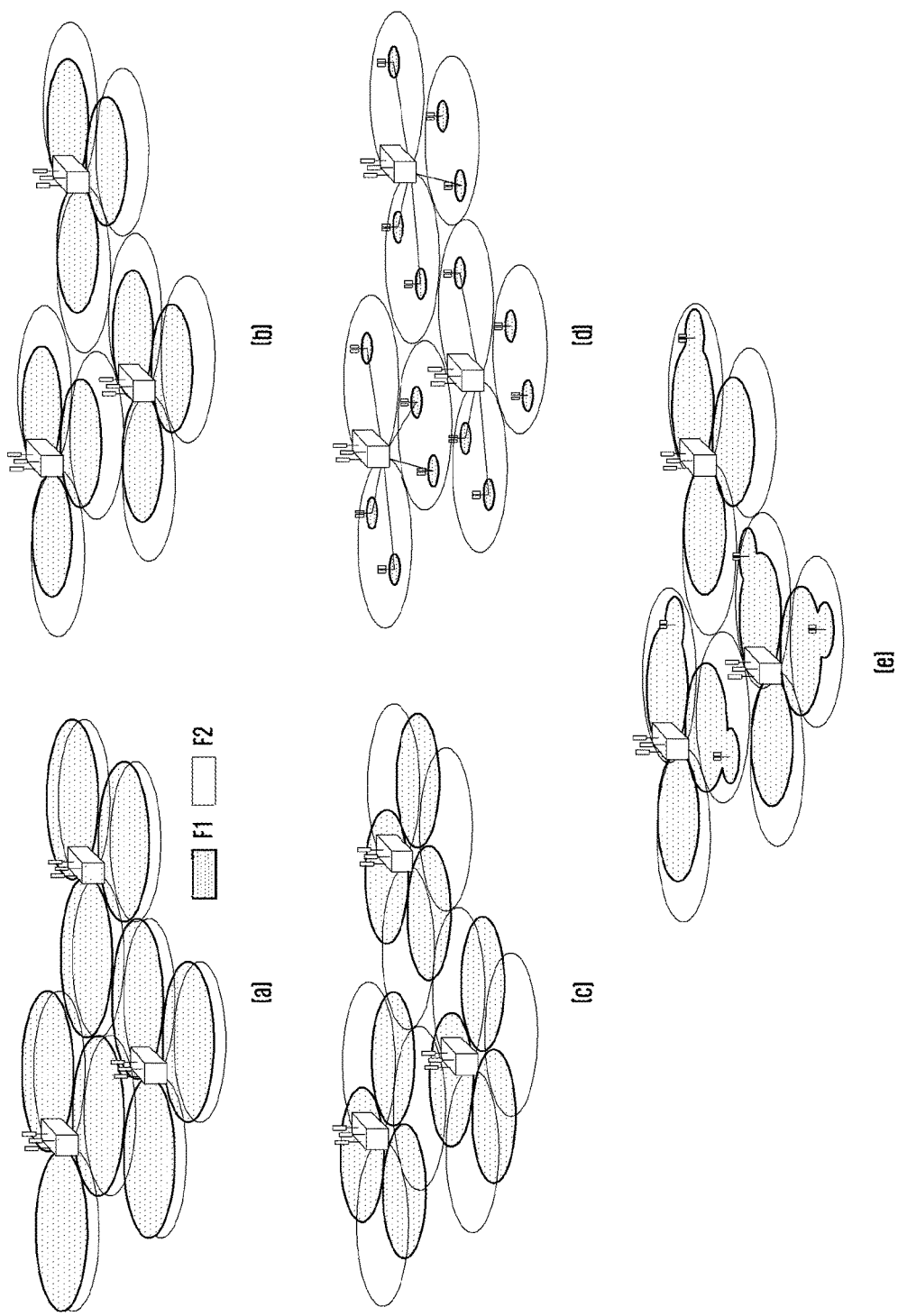
FIG. 4 illustrates examples of a wireless network scenario of a carrier aggregation technology.

In the following description of embodiments of the present invention, a detailed description of known functions or configurations incorporated herein will be omitted when it is determined that the detailed description thereof may unnecessarily obscure the subject matter of the present invention.

Hereinafter, embodiments of the present invention will be described with reference to the accompanying drawings. The terms which will be described below are terms defined in consideration of the functions in the present disclosure, and may be different according to users, intentions of the users, or customs. Therefore, the definitions of the terms should be determined based on the contents throughout the specification.

FIG. 2 schematically illustrates a single carrier downlink protocol structure.

Referring to FIG. 2, a radio access network protocol structure of Long Term Evolution (LTE) from a viewpoint of data may include a Packet Data Convergence Protocol (PDCP) layer, a Radio Link Control (RLC) layer, a Medium Access Control (MAC) layer, and a physical layer. The PDCP layer corresponding to a highest layer of the radio access network processes a control signal and an Internet Protocol (IP) data packet and performs compression of a header of the data packet and encryption. The RLC layer is located between the PDCP layer and the MAC layer, and serves to divide the packet to packets having a size which can be transmitted, as well as arrange and assemble the divided packets. Further, the RLC layer serves to re-transmit the packet when the packet is lost and the MAC layer retains a buffer for scheduling. The MAC layer is located between the RLC layer and the physical layer, and performs data scheduling, multiplexing and demultiplexing of several logical channels of one user, and a Hybrid Automatic Retransmission request (HARM) function. The physical layer is a lowest layer, and performs a packet error correction coding and modulation/demodulation and physically generates a signal.

FIG. 3 schematically illustrates a carrier aggregation downlink protocol structure.

Referring to FIG. 3, a structure of a protocol for a carrier aggregation technology of LTE maintains the PDCP layer, the RLC layer, and the physical layer equally to the downlink protocol structure of the single carrier technology to be compatible with the previous technology, that is, the single carrier technology. However, the carrier aggregation downlink protocol structure performs processing for carrier aggregation in the MAC layer. At this time, the RLC layer maintains one buffer regardless of a single carrier or the number of carriers in the carrier aggregation, and the MAC layer schedules multiple carriers in the carrier aggregation, receives packets from the buffer of the RLC layer, and allocates the packets to resources of each of the carriers.

However, since the RLC layer has only one buffer regardless of the number of carriers in the carrier aggregation in an LTE standard, the MAC layer cannot simultaneously schedule multiple carriers. When the RLC layer determines the size of a packet which is scheduled and transmitted in one carrier and does not exclude the corresponding packet from the buffer, the same packet may be simultaneously selected in several carriers and allocated to resources.

FIGS. 4A to 4E illustrate examples of wireless network scenarios of the carrier aggregation technology.

Referring to FIGS. 4A to 4E, five wireless network scenarios according to a coverage and a system type of a component carrier in the carrier aggregation technology of LTE is illustrated. In a first scenario illustrated in FIG. 4A, when coverages of two carriers are the same, directions of Base Station (BS) antennas of respective carriers are the same. Further, in a second scenario illustrated in FIG. 4B, when coverages of two carriers are different, directions of Base Station (BS) antennas of respective carriers are the same. In addition, FIG. 4E illustrates a fifth scenario in which a service area of the carrier having the smaller coverage is expanded through a wireless relay in the second scenario. In a third scenario illustrated in FIG. 4C, a center of a direction of a BS antenna of one carrier faces a cell boundary area of another carrier. FIG. 4D illustrates a fourth scenario in which one carrier configures large cells covering all areas and another carrier configures small cells in areas having large demands for data.

Since a direction of an antenna of each carrier faces a cell boundary area of another carrier in the third scenario of the wireless network scenarios, the third scenario can greatly improve a data transmission rate of the user in the cell boundary area in comparison with the first scenario. However, in the third scenario, according to each carrier, a combination of included cells may vary depending on a position of the user and a channel environment.

FIG. 5 illustrates an example of distribution of UEs in the example of the wireless network scenario of the carrier aggregation technology.

Referring to FIG. 5, in the third scenario illustrated in FIG. 4C, cells and UEs (terminals) 521, 523, 525, and 527 which are connected to one BS 510 may be distributed. For example, a first UE 521 can perform carrier aggregation in a first cell 531 and a fourth cell 534, and a second UE 523 can perform carrier aggregation in a second cell 521 and the fourth cell 534. Similarly, a third UE 525 can perform carrier aggregation in the second cell 532 and a fifth cell 535, and a fourth UE 527 can perform carrier aggregation in a combination of a third cell 533 and a sixth cell 536. Table 1 below shows cells selected based on respective carriers of the UEs 521, 523, 525, and 527 in FIG. 5.

TABLE 1

|  | First carrier | Second carrier |
| --- | --- | --- |
| first UE | first cell | fourth cell |
| second UE | second cell | fourth cell |
| third UE | second cell | fifth cell |
| fourth UE | third cell | sixth cell |

FIG. 6 illustrates an example of a multi-cell carrier scheduler.

Referring to FIG. 6, an example of a packet scheduler 650 in the third scenario described in FIGS. 4C and 5 is illustrated. As illustrated in FIG. 6, in carrier aggregation, the RLC layer has one buffer with respect to each of the UEs 621, 623, 625, and 627 and the buffer is shared between component carriers. Therefore, for example, when the packet scheduler 650 schedules a first UE 621 in a first cell 632, the packet scheduler 650 requires information indicating whether a packet of the first UE 621 is scheduled in a cell of another carrier, that is, in a fourth cell 631, information on a buffer size left after the scheduling and the like. Similarly, when the packet scheduler 650 schedules the first UE 621 in the fourth cell 634, the packet scheduler 650 requires information indicating whether the packet of the first UE 621 is scheduled in the first cell 631, information on a buffer size left after the scheduling and the like. Accordingly, in order to avoid overlaps in the scheduling, the first cell 631 and the fourth cell 631 cannot be simultaneously scheduled for the same buffer, and the cells should be sequentially scheduled in such a manner that the fourth cell 634 is scheduled after the first cell 631 is scheduled or the first cell 631 is scheduled after the fourth cell 634 is scheduled.

In the third scenario, the UEs select the same cell in one carrier, but may select different cells in another carrier. For example, as described above, referring to FIG. 5, the second UE 523 and the third UE 525 may select the second cell 532 in the first carrier. However, in the second carrier, the second UE 523 may select the fourth cell 534 and the third UE 525 may select the fifth cell 535. As a result, the second UE 523 and the third UE 525 may select different cells in the second carrier. Further, in the third scenario, a combination of cells which the UE selects in each carrier may more vary in comparison with the first scenario.

Accordingly, considering scheduling in another carrier by the UE included in a particular cell, the number of cells which should be sequentially scheduled may increase. For example, considering the first UE 521 in FIG. 5 and Table 1, the fourth cell 534 may be scheduled after the first cell 531 is scheduled. Further, considering the second UE 523, the second cell 532 may be scheduled only when a result of the scheduling of the fourth cell 534 is recognized.

Considering a cell combination of each carrier of each user, the cells should be sequentially scheduled, so that the scheduling time may increase in proportion to the number of carriers and cells. In the third scenario of FIG. 5, when a total of six cells 631, 632, 633, 634, 635, and 636 are considered for two carriers, scheduling of the six cells are sequentially performed and thus it takes six times longer than the single carrier scheduling.

FIG. 7 illustrates an example of a multi-cell carrier scheduler according to an embodiment of the present invention.

Referring to FIG. 7, a multi-cell carrier scheduler 750 according to an embodiment of the present invention may be configured by a device for processing a plurality of single carrier single cell scheduling in parallel in order to reduce a time delay according to sequential scheduling in the BS of the carrier aggregation system. When the carrier aggregation technology is applied, carrier schedulers 771, 772, 773, 774, 775, and 776 share RLC buffers 740 (741, 743, 745, and 747). Accordingly, the present invention provides Buffer Occupancy (BO) splitters 761, 763, 765, and 767 at buffer output terminals 741, 743, 745, and 747 and allocates the BOs with which resources can be allocated by the carrier schedulers 771, 772, 773, 774, 775, and 776 to the carrier schedulers 771, 772, 773, 774, 775, and 776. For example, the BO corresponds to a size of the packet occupying the buffer 741, 743, 745, or 747. The carrier schedulers 771, 772, 773, 774, 775, and 776 perform scheduling with a packet size within the BO and may load a packet with the corresponding size from the buffers 741, 743, 745, and 747, and generate and transmit a MAC layer packet to the scheduled UE. When the scheduling is performed using the carrier aggregation technology, each of the carrier schedulers 771, 772, 773, 774, 775, and 776 according to the embodiment of the present invention performs the scheduling with a packet size within the BO allocated by the BO splitters 761, 763, 765, and 767, and may load a packet with the corresponding size from the buffer 740, and generate and transmit a MAC layer packet to the scheduled UEs 721, 723, 725, and 727. At this time, the MAC layer packet transmitted to the UE may increase multiple times of maximum carriers in comparison with the single carrier system.

In some embodiments, the BO splitters 761, 763, 765, and 767 may receive at least one of the BO for each of the UEs 721, 723, 725, and 727, cell information of each carrier for each of the UEs 721, 723, 725, and 727, channel quality, a load amount of each carrier (or each cell) (for example, time-frequency resources averagely used), and scheduling information 780 for each cell such as a priority configured for each carrier and each cell. Further, the BO splitters 761, 763, 765, and 767 may discriminate the BOs according to cells 731, 732, 733, 734, 735, and 736 selected for respective carriers of the UEs 721, 723, 725, and 727 based on the received information 780 and transmit the BOs to the corresponding schedulers 771, 772, 773, 774, 775, and 776.

For example, the BO splitter 761 of the first UE 721 may distribute the BOs to the first cell 731 of the first carrier and the fourth cell 734 of the second carrier. Further, the BO splitter 763 of the second UE 723 may distribute the BOs to the second cell 732 of the first carrier and the fourth cell 734 of the second carrier, and the BO splitter 765 of the third UE 725 may distribute the BOs to the second cell 732 of the first carrier and the fifth cell 735 of the second carrier. The BO splitter 767 of the fourth UE 727 may distribute the BOs to the third cell 733 of the first carrier and the sixth cell 736 of the second carrier. The single carrier single cell schedulers 771, 772, 773, 774, 775, and 776 of each carrier and each cell may perform scheduling, equally to the single carrier UE, within the BOs allocated to the corresponding UEs 721, 723, 725, and 727 by the BO splitters 761, 763, 765, and 767 and generate packets. The first UE 721 receives packets from two carriers such as the first cell 731 of the first carrier and the fourth cell 734 of the second carrier.

FIG. 8 illustrates an example of a flowchart illustrating operations of the BO splitter according to an embodiment of the present invention.

According to the description in the part related to FIG. 7, if BOs are always distributed with a consistent ratio or a fixed size in the BO distribution, resources may be allocated efficiently. For example, since a packet size which can be actually transmitted in each carrier may vary depending on a data transmission rate for each carrier according to a channel status of the UE and a resource amount which can be used by the corresponding UE according to a bandwidth and a load amount of a cell included in each carrier, the BO distribution with a consistent ratio or a fixed size may cause the resources to be inefficiently allocated. It may be assumed that one UE can transmit data at 50 Mbps in the first carrier and at 10 Mbps in the second carrier. At this time, when the same BO is distributed, all packets are transmitted and resources may not be allocated and be left in the first carrier. Also, it happens when available resources are different.

Further, when a size of a packet within the buffer is small and thus transmission is possible in only one of the two carriers, resource allocation to only one carrier is more advantageous in a viewpoint from the HARQ and other indirect costs rather than resource allocation to the two carriers. Accordingly, in some embodiments, properly distributing the BOs according to respective carries and cells in the BO distribution is required.

Referring to FIG. 8, in step 810, the BO splitter selects a cell n[1] in the first carrier and a cell n[2] in the second carrier with respect to a k-th UE. Further, in step 820, the BO splitter may receive parameters C[k][1] and C[k][2] from the cells n[1] and n[2], respectively. The parameter C[k][1] or C[k][2] is a reference value for each cell corresponding to each cell to distribute the BOs, and may indicate, for example, one of the following.

1) data transmission rates of the k-th UE in the first carrier and the second carrier according to a channel status 2) average resource amounts of the k-th UE in the cells n[1] and n[2] included in the first carrier and the second carrier, for example, total resource amounts ? average resource use amounts 3) fixedly preset constants in the cells n[1] and n[2] of the first carrier and the second carrier 4) product or weight product of two or three values of 1), 2), and 3)

Thereafter, in step 830, the BO splitter may set a BO distribution threshold (boSplitThre[k]). For example, the BO distribution threshold may be set as a value generated by multiplying a larger one between C[k][1] and C[k] [2] by a predetermined constant. Further, in step 840, the BO splitter may receive bo[k] corresponding to a BO size of the k-th UE.

In step 850, the BO splitter may compare the BO distribution threshold (boSplitThre[k]) set in step 830 and the BO size bo[k] of the k-th UE set in step 840.

As a result of the comparison, when the BO size bo[k] of the k-th UE is larger than or equal to the BO distribution threshold (boSplitThre[k]), the BO splitter may distribute the BOs to the cells n[1] and n[2] in proportion to C[k][1] and C[k][2] in step 860 since BO distribution to the two cells n[1] and n[2] is more effective.

When the BO size bo[k] of the k-th UE is smaller than the BO distribution threshold (boSplitThre[k]), BO distribution to one of the two cells n[1] and n[2] may be more macroscopically efficient. Accordingly, when C[k][1] is larger than or equal to C[k][2] through the comparison between C[k][1] and C[k][2] in step 870, the BO splitter may distribute the BO to the cell n[1] in step 880. Further, when C[k][1] is smaller than C[k][2], the BO splitter may distribute the BO to the cell n[2] in step 885.

Thereafter, in step 890, the BO splitter transmits the distributed BO value for each cell or each carrier to the scheduler of the corresponding cell n1[1] and cell n[2].

FIG. 9 is a block diagram illustrating a BS according to an embodiment of the present invention.

Referring to FIG. 9, a controller 910 controls the BS to perform one of the operations described in the aforementioned embodiments. For example, the controller 910 may make a control to obtain a mapping relation between a cell and a carrier for each UE, receive scheduling information for each cell, distribute data of each UE to one of the cells corresponding to UEs by using the mapping relation between the cell and the carrier and the scheduling information for each cell, and schedule the distributed data.

A communication unit 920 transmits/receives a signal according to one of the operations described in the aforementioned embodiments. For example, the communication unit 920 may transmit data, such as packets and the like, to the UE.

FIG. 10 is a block diagram illustrating a UE according to an embodiment of the present invention.

Referring to FIG. 10, a controller 1010 controls the UE to perform one of the operations of the aforementioned embodiments. For example, the controller 1010 may control the UE to transmit channel status information, data size information of the UE and the like to the BS.

A communication unit 1020 transmits/receives a signal according to one of the operations of the aforementioned embodiments. For example, the communication unit 1020 may receive data, such as packets or the like, from the BS.

Meanwhile, when the carrier aggregation system scheduler is implemented, the present invention processes scheduling of each carrier and each cell in parallel, thereby efficiently supporting carrier aggregation between a plurality of carriers and a plurality of cells. Further, the present invention can reduce scheduling time and complexity and provide expandability to easily increase the number of carriers or cells.

Although the aggregation of two carriers has been described as an example for the convenience of descriptions, the configuration and operation of the present invention are not limited only to the aggregation of the two carriers and can be expanded to a carrier aggregation system in which two or more carriers are aggregated in the same way.

Embodiments of the present invention disclosed in the specification and the drawings are only particular examples to easily describe the technical matters of the present invention and assist for understanding of the present invention, but do not limit the scope of the present invention. It is apparent to those skilled in the art that other modified examples based on the technical idea of the present invention can be implemented as well as the embodiments disclosed herein.

Therefore, the detailed descriptions should not be construed to be limited in all aspects, but should be considered to be an example. The scope of the present invention should be determined by rational interpretation of the appended claims, and all modifications within a range equivalent to the present invention should be construed as being included in the scope of the present invention.

The invention claimed is:

1. A communication method of a Base Station (BS), the communication method comprising:
   configuring carrier aggregation of cells to a User Equipment (UE);
   obtaining a mapping relation between the cells and carriers for the UE;
   receiving scheduling information for each cell;
   identifying a data distribution threshold for the UE based on a reference value for each cell, wherein the reference value for each cell includes at least one of a data transmission rate for each carrier according to a channel status of the UE and an available resource amount for each cell corresponding to each carrier for the UE;
   determining, based on the data distribution threshold, whether to distribute data for the UE to at least one of the cells;
   based on a result of the determination, distributing the data for the UE to the at least one of the cells, by using the mapping relation and the scheduling information for each cell; and
   scheduling the distributed data.

2. The communication method of claim 1, wherein the distributing of the data comprises allocating the data for the UE to a scheduler, and wherein the scheduling of the distributed data comprises scheduling the distributed data to a cell corresponding to the scheduler by the scheduler.

3. The communication method of claim 1, wherein the scheduling information for each cell includes at least one of information on a size of the data for each UE, channel quality information, a load amount of each carrier, a load amount of each cell, a preset priority of each carrier, or a preset priority of each cell.

4. The communication method of claim 1, further comprising:
   receiving the reference value for each cell corresponding to the UE.

5. The communication method of claim 1, wherein determining whether to distribute the data for the UE to at least one of the cells comprises:
   comparing the data distribution threshold with a size of the data for the UE,
   wherein, when the size of the data for the UE is larger than or equal to the data distribution threshold, distributing the data for the UE to each cell based on the reference value for each cell, and
   when the size of the data for the UE is smaller than the data distribution threshold, distributing the data for the UE to the cell having a larger reference value.

6. The communication method of claim 1, wherein the data distribution threshold is a value generated by multiplying a largest value of the reference values for respective cells by a preset constant.

7. The communication method of claim 1, wherein the distributing of the data comprises distributing the data for the UE to the cells according to a ratio of the reference values for respective cells.

8. A Base Station (BS) comprising:
   a transceiver; and
   a controller coupled with the transceiver and configured to control to:
      configure carrier aggregation of cells to a User Equipment (UE),
      obtain a mapping relation between the cells and carriers for the UE,
      receive scheduling information for each cell,
      identify a data distribution threshold for the UE based on a reference value for each cell, wherein the reference value for each cell includes at least one of a data transmission rate for each carrier according to a channel status of the UE and an available resource amount for each cell corresponding to each carrier for the UE,
      determine, based on the data distribution threshold, whether to distribute data for the UE to at least one of the cells,
      based on a result of the determination, distribute the data for the UE to the at least one of the cells, by using the mapping relation and the scheduling information for each cell, and
      schedule the distributed data.

9. The BS of claim 8, wherein the controller is configured to:
   allocate the data for the UE to a scheduler, and
   control the scheduler to provide scheduling of the distributed data to a cell corresponding to the scheduler.

10. The BS of claim 8, wherein the scheduling information for each cell includes at least one of information on a size of the data for each UE, channel quality information, a load amount of each carrier, a load amount of each cell, a preset priority of each carrier, or a preset priority of each cell.

11. The BS of claim 8, wherein the controller is configured to control to:
    receive the reference value for each cell corresponding to the UE.

12. The BS of claim 8, wherein the controller is configured to:
    compare the data distribution threshold with a size of the data for the UE,
    wherein, when the size of the data for the UE is larger than or equal to the data distribution threshold, the controller is configured to control to distribute the data for the UE to each cell based on the reference value for each cell, and
    when the size of the data for the UE is smaller than the data distribution threshold, the controller is configured to control to distribute the data for the UE to the cell having a larger reference value.

13. The BS of claim 8, wherein the data distribution threshold is a value generated by multiplying a largest value of the reference values for respective cells by a preset constant.

14. The BS of claim 8, wherein the controller is configured to distribute the data for the UE to the cells according to a ratio of the reference values for respective cells.

15. The communication method of claim 2, wherein scheduling the distributed data to the cell corresponding to the scheduler comprises scheduling each carrier and each cell in parallel.

16. The BS of claim 9, wherein scheduling the distributed data to the cell corresponding to the scheduler comprises scheduling each carrier and each cell in parallel.

\* \* \* \* \*